Jan. 25, 1966     E. C. JACKSON     3,231,201
BURNER ASSEMBLY
Filed April 29, 1963     3 Sheets-Sheet 1
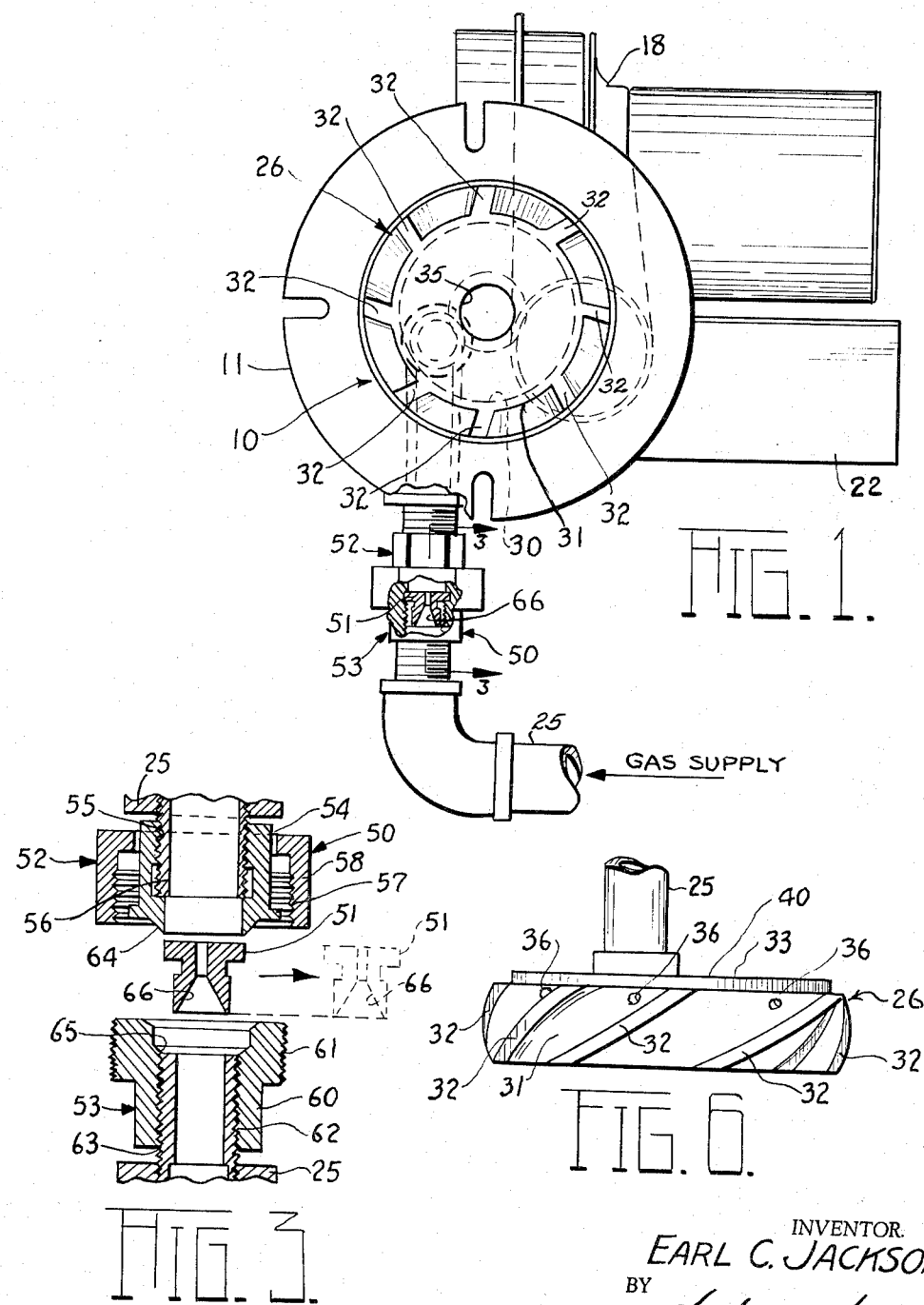
INVENTOR.
EARL C. JACKSON
BY
Hauke + Hauke
ATTORNEYS

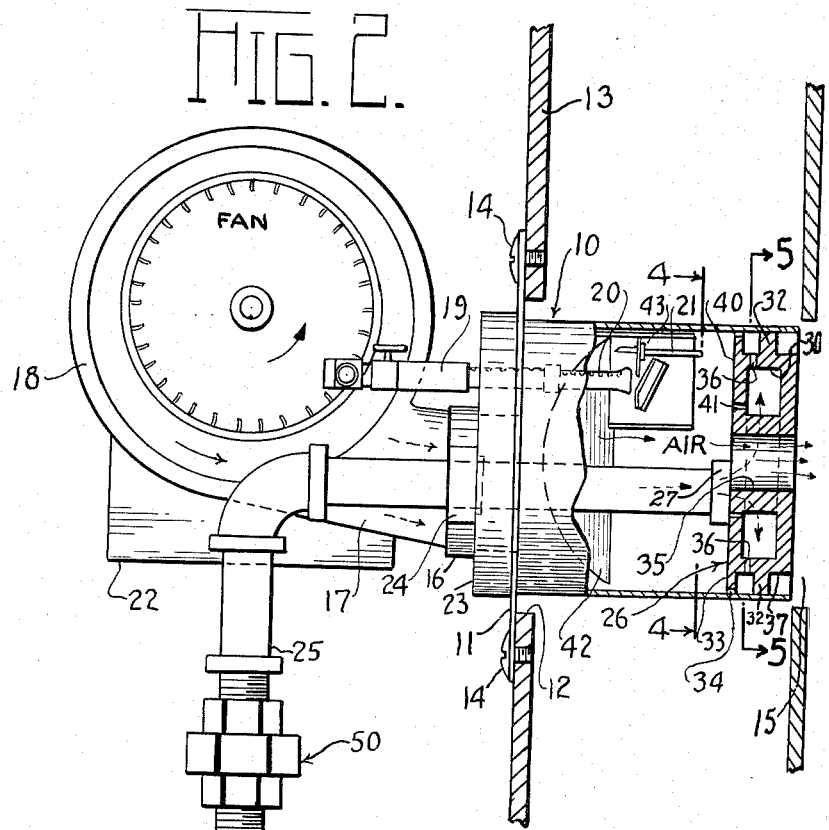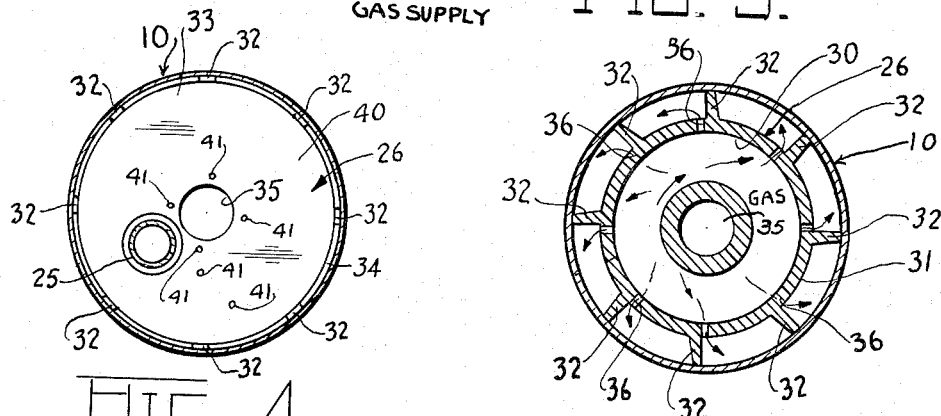

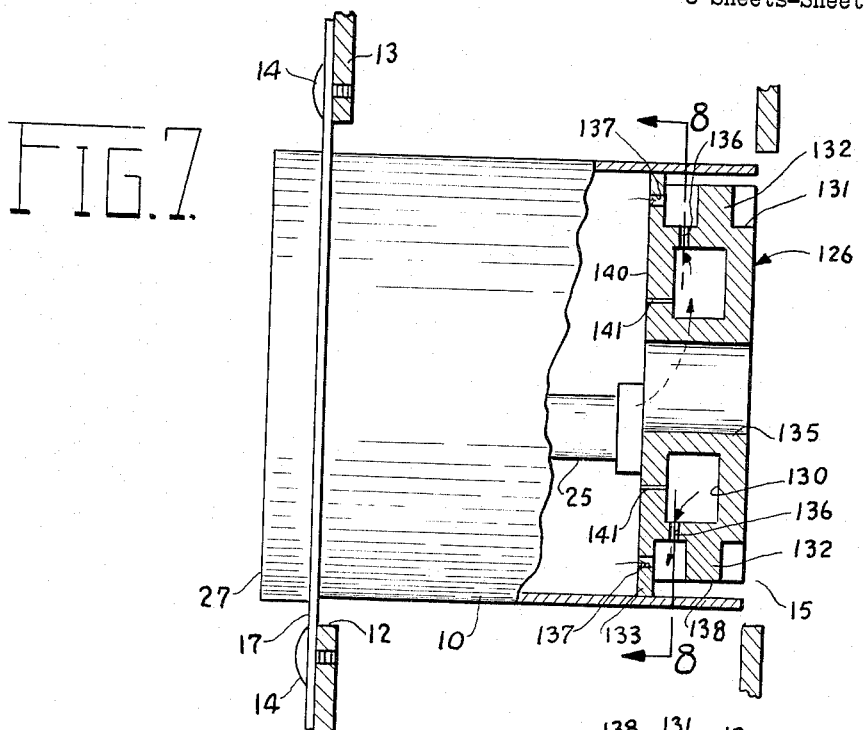
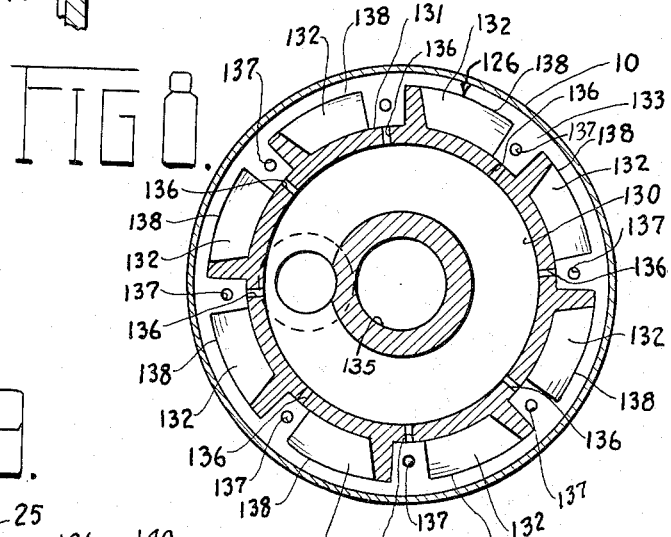
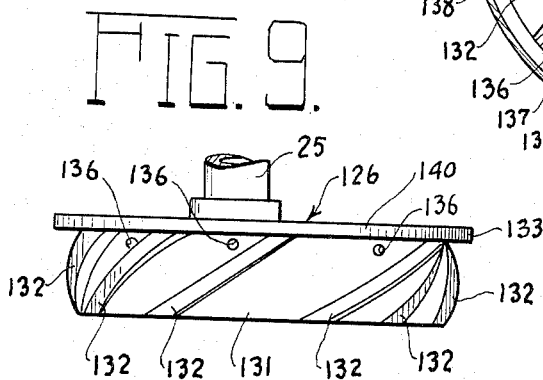

United States Patent Office 3,231,201
Patented Jan. 25, 1966

3,231,201
BURNER ASSEMBLY
Earl C. Jackson, Detroit, Mich., assignor to Magic Servant Products Company, Detroit, Mich., a corporation of Michigan
Filed Apr. 29, 1963, Ser. No. 279,697
13 Claims. (Cl. 239—399)

The present invention is a continuation-in-part of my now abandoned application Serial No. 260,699, filed February 25, 1963, and relates to heating units and more particularly to an improved burner assembly having means for discharging a fuel-air mixture to the furnace at a pressure sufficient to overcome the pressure produced in a pressurized hearth.

Burner assemblies which have been designed for use in ordinary heating systems generally are unsuitable for use in heating units in which a pressurized hearth or combustion space is provided because these assemblies will not introduce the fuel-air mixture to the furnace at a pressure sufficient to overcome the pressure produced in the hearth. The present invention provides a burner assembly suitable for use with both ordinary heating systems and with those systems in which a pressurized hearth is used. The present invention further provides means promoting a complete fuel-air mixture and a combustion flame substantially devoid of cold spots. The burner of the present invention also eliminates the need for a fuel-air mixer tube which was heretofore necessary in burner assemblies. This makes it possible to provide burner assemblies with a much shorter firing tube for use in small or compact designed equipment. Further, a master orifice has been provided which permits regulation of fuel emitted through the burner orifices.

It is an object then of the present invention to increase the utility of burner assemblies by providing such an assembly suitable for use with heating systems using a pressurized hearth or combustion space.

It is another object of the present invention to increase the efficiency of heating units by providing a burner assembly having means promoting the complete mixture of the fuel and air prior to discharge into the hearth of the furnace.

It is still another object of the present invention to increase the efficiency of heating units by providing a burner assembly having a plurality of annularly spaced fuel discharging orifices and means discharging a fuel air mixture substantially axially with respect to the annularly spaced orifices.

It is another object of the present invention to facilitate the adjustment of burner assemblies having a plurality of fuel discharging orifices by providing a master orifice for regulating fuel flow to the discharging orifices.

Still further objects and advantages of the present invention will readily occur to one skilled in the art to which the present invention pertains upon reference to the following drawings in which like characters refer to like parts throughout the several views and in which FIG. 1 is an elevational end view of one preferred burner assembly of the present invention with portions in section and other portions removed for purposes of clarity.

FIG. 2 is an elevational view as seen substantially from the left side of FIG. 1 and with portions in section for purposes of clarity.

FIG. 3 is a cross-sectional exploded view taken substantially on line 3—3 of FIG. 1.

FIG. 4 is a cross-sectional view taken substantially on line 4—4 of FIG. 2.

FIG. 5 is a cross-sectional view taken substantially on line 5—5 of FIG. 2.

FIG. 6 is an elevational side view of a preferred manifold member of the present invention.

FIG. 7 is a fragmentary view similar to FIG. 2 but illustrating a portion of another preferred burner assembly of the present invention.

FIG. 8 is a cross sectional view taken substantially on line 8—8 of FIG. 7, and

FIG. 9 is an elevational side view of another preferred manifold member of the present invention.

Now referring to the drawings for a more detailed description of the present invention, a preferred burner assembly is illustrated as comprising a substantially cylindrical tubular housing 10. The housing 10 is preferably provided with an annular radially outwardly extending flange 11 so that the housing 10 may be inserted in a suitable opening 12 in a furnace wall 13 and secured in place by bolts or screws 14 as illustrated in FIG. 2.

The end 23 of the housing 10 positioned exteriorly of the entrance 15 to the hearth of the furnace is closed and is provided with an eccentrically positioned cylindrical boss portion 16 which is adapted to receive a discharge conduit 17 of a blower assembly 18.

A conventional pilot assembly 19 is provided with a lighting tube 20 and a thermocouple 21 positioned in the housing 10 as can best be seen in FIG. 2. Suitable electric controls are carried in a box 22 secured to the blower assembly 18.

The closed end 23 of the housing 10 is also provided with a second cylindrical eccentrically positioned boss portion 24 which carries a fuel conduit 25. The fuel conduit 25 is adapted for connection at one end to a source of fuel under pressure (not shown) and at the other end to a manifold member 26 positioned at the inner end of the housing 10. A flange 27 is provided on the fuel conduit 25 as can best be seen in FIG. 2 to position the manifold member 26 with respect to the end of the tubular housing 10.

As can best be seen in FIGS. 1, 2, 5 and 6, the manifold member 26 is substantially annular and is provided with an annular distributing chamber 30. The manifold member 26 is further provided with an axially extending annular surface 31 which is spaced from the inner wall of the housing 10 by a plurality of fin elements 32. A radially extending flange portion 33 is provided on the inner end of the surface 31 as can be seen in FIG. 2 and extends to a position spaced from the interior of the housing 10 as shown. The fuel conduit 25 communicates with the distributing chamber 30 in an off center position as shown so that a central opening 35 may be provided through the manifold 26.

As can best be seen in FIG. 6, the fin elements 32 are helical about the axis of the manifold member 26 and a plurality of annularly spaced radially extending orifices 36 are provided on the surface 31 in communication with the distributing chamber 30. Preferably the orifices 36 are positioned closely adjacent the flange portion 33 and close to the inner ends of the fin elements 32 with one orifice 36 intermediate each pair of adjacent fin elements 32.

As can best be seen in FIG. 4, the inner surface 40 of the manifold member 26 is provided with a plurality of axially extending orifices 41 communicating with the chamber 30 with some of the orifices 41 preferably spaced closely adjacent the central opening 35 and others more outwardly spaced.

As can best be seen in FIG. 2, baffles 42—43 are provided in the housing 10 to protect the pilot assembly 19 and to deflect the air delivered by the blower assembly 18 toward the manifold member 26 in a substantially balanced air flow, the air intake being initially off center.

A coupling indicated generally at 50 in FIGS. 1, 2 and 3 is provided in the fuel supply (not shown). A master orifice member 51 as can best be seen in FIGS. 1 and 3 is removably carried in the coupling 50 intermediate a female member 52 and a male member 53. The female member 52 is preferably comprised of a body portion 54 having a threaded inner peripheral portion 55 adapted to receive an externally threaded member 56, which is in turn carried by the conduit 25. A radially extending flange 57 is provided on the body portion 54 to limit axial movement of an internally threaded sleeve 58.

The male member 53 preferably comprises a body portion 60 having an externally threaded portion 61 adapted to receive the sleeve 58 and an internally threaded portion 62 adapted to receive an externally threaded member 63 which is in turn carried by the fuel conduit 25.

The body portion 54 is provided with a conical face section 64 which bears against the master orifice member 51 and when the sleeve 58 is tightened urging same to bear against the end of an inner shoulder 65 provided in the body portion 60. This provides an effective seal and directs fuel through an orifice 66 in the master orifice member 51.

As can best be seen in FIG. 3, the master orifice member 51 can be changed by first loosening the sleeve 58 and then rotating the body portions 54–60 into the threaded members 56–63 respectively to produce separation of the body portions 54–60. The master orifice member 51 then can be replaced with a similar member having a different size orifice 66. In this way, the fuel emitted by the orifices 36–41 may be varied to a desired maximum without the necessity of regulating the size of each of the orifices 36–41 as was heretofore necessary.

The burner assembly of the present invention is adapted for use with a hearth or combustion space which is pressurized although it can be used with other types of heating systems as well. The baffle 42 and the restriction formed by the surface 40 of the manifold member 26 builds up the pressure of the air delivered to the assembly by the blower assembly 18 sufficiently to overcome the pressures in the hearth so that a fuel-air mixture will be discharged by the manifold member 26 into the pressurized hearth.

In operation, the fan 18 is actuated to deliver pressurized air through the discharge conduit 17 and into the housing 10. At the same time, fuel is supplied through the fuel conduit 25 to the distributing chamber 30. Of the pressurized air filling the housing 10, a main stream is directed through the passage 34 to pick up the fuel emitted from the orifices 36. The air, breaking over the edges of the surface 40, provides a turbulence near the inner ends of the fin elements 32 which promotes optimum fuel-air mixing. The fin elements 32 impart a swirl to the pressurized fuel-air mixture as it enters the hearth to produce a better mixture and thus greater combustion efficiency than is possible with many of the burner assemblies presently being made.

A second pressurized air stream mixes with fuel emitted rearwardly from the orifices 41 and this second pressurized fuel-air mixture then passes forwardly through the central opening 35 and into the hearth. The second fuel-air mixture eliminates the central cold spot which would be produced if the only combustion flame relied upon were that produced by the fuel-air mixture passing over the fin elements.

FIGS. 7–9 illustrate another preferred burner assembly of the present invention substantially similar to the one described above except that another preferred manifold member 126 is carried in the inner end of the housing 10. The manifold member 126 is provided at its inner end with a radially extending flange portion 133 which engages the inner wall of the housing 10.

The fuel conduit 25 communicates with a substantially annular distributing chamber 130 provided in the manifold member 126. The fuel conduit 25 is in an off-center position with respect to the manifold member 126 as shown so that a central opening 135 may be provided through the manifold member 126.

As can best be seen in FIG. 8, the manifold member 126 is provided with a surface 131 extending axially outwardly from the flange portion 133. A plurality of annularly spaced fin elements 132 is provided on the surface 131. The fin elements 132 are helical about the axis of the manifold member 126 and extend radially outwardly from the surface 131 to form axially extending edges 138 which are spaced from the inner wall of the housing 10 as shown.

A plurality of annularly spaced radially extending orifices 136 are provided on the surface 131 in communication with the distributing chamber 130. Preferably the orifices 136 are positioned closely adjacent the flange portion 133 and close to the inner ends of the fin elements 132 with one orifice 136 intermediate each pair of adjacent fin elements 132. A plurality of annularly spaced axially extending perforations 137 are provided in the flange portion 133 with one perforation 137 intermediate each pair of adjacent fin elements 132.

As can best be seen in FIG. 7 the inner radially extending surface 140 of the manifold member 126 is provided with a plurality of axially extending orifices 141 communicating with the chamber 130 with some of the orifices 141 preferably spaced closely adjacent the central opening 135 and others more outwardly spaced.

The operation of the embodiment illustrated in FIGS. 7–9 is substantially similar to the operation of the burner assembly illustrated in FIGS. 1–6 except that the primary stream of pressurized air is directed through the perforations 137 to pick up the fuel emitted from the orifices 136. Air flow across the edge of the flange portion 133 is prevented by the substantially sealing engagement between the flange portion 133 and the housing 10. The fin elements 132 impart a swirl to the pressurized fuel-air mixture to promote optimum mixing. Combustion heat passing over the edges 138 of the fin elements insures that the fuel-air mixture produced by each pair of perforation 137 and orifice 136 will be ignited.

A second pressurized air stream mixes with the fuel emitted rearwardly from the orifices 141 and this second pressurized fuel-air mixture then passes forwardly through the central opening 135 and into the hearth of the furnace. The second fuel-air mixture eliminates the cold spot as described above.

Although I have described several embodiments of the present invention, it is apparent that many other changes and modifications can be made without departing from the spirit of the present invention or the scope of the appended claims.

I claim:

1. A burner assembly comprising
   (a) a tubular housing having one end adapted to be carried in the combustion space of a furnace and the other end connected to an air supply means,
   (b) a hollow manifold member carried in said tubular housing and having an axially extending annular surface spaced from the inner wall thereof, to define an annular passage intermediate said annular surface and said tubular housing,
   (c) a plurality of spaced fin elements carried on said surface, to direct air from said air supply means substantially axially through said annular passage,
   (d) a source of fuel under pressure and means conducting fuel from said source to the interior of said manifold member, and
   (e) said manifold being provided with a plurality of annularly spaced radially disposed orifices extending radially through said annular surface and directing fuel from the interior of said manifold member radially outwardly to said annular passage, said orifices being disposed in said annular surface intermediate said fin elements whereby air from said air supply is mixed with fuel emitted by said orifices and directed by said fin elements into said combustion space.

2. The burner assembly as defined in claim 1 and in which said manifold member substantially blocks air flow through said tubular housing whereby to build up the pressure of the fuel-air mixture discharged into said combustion space.

3. The burner assembly as defined in claim 2 and in which said fin elements are positioned to impart a swirl to the fuel-air mixture discharged into said combustion space whereby to induce a complete mixture of the air and fuel and to produce a substantially annular first flame in said combustion space.

4. The burner assembly as defined in claim 3 and in which said manifold member is provided with a substantially central opening extending therethrough and at least one orifice being provided in said manifold member closely adjacent said opening and positioned to emit fuel against air flowing through said central opening whereby a substantially axially extending second flame is produced in said combustion space.

5. The burner assembly as defined in claim 1 and in which
 (a) said fin elements engage the inner wall of said housing,
 (b) a radially extending flange portion being provided on said manifold member upstream of said fin elements, and
 (c) the radially outward edge of said flange portion being spaced from the inner wall of said housing whereby to provide an annular passage intermediate said housing and said edge to direct air between said fin elements to mix with fuel emitted by said orifices.

6. The burner assembly as defined in claim 1 and in which
 (a) said fin elements being radially inwardly spaced from the inner wall of said housing,
 (b) a radially extending flange portion being provided on said manifold member upstream of said fin elements,
 (c) said flange portion engaging the inner wall of said housing whereby to substantially block air flow through said tubular housing to build up the pressure of the air delivered by said air supply means,
 (d) annularly spaced perforations provided in said flange portions each being positioned intermediate a pair of adjacent fin elements whereby to direct air between said fin elements to mix with fuel emitted by said orifices.

7. A burner assembly, comprising:
 (a) a tubular housing having one end adapted to be carried adjacent the combustion space of a furnace and the other end connected to an air supply means,
 (b) a manifold member having an annular axially extending chamber, said manifold member being carried in said tubular housing and having an axially extending surface spaced from the inner wall thereof,
 (c) a plurality of spaced helically extending fin elements carried on said surface,
 (d) a source of fuel under pressure and means conducting fuel from said source to said chamber,
 (e) said manifold being provided with a plurality of radially extending orifices disposed intermediate said fin elements and extending between said chamber and said surface whereby fuel from said fuel source delivered to said chamber is emitted through said orifices and mixed with air at said surface delivered from said air supply, said fuel-air mixture being then directed in a swirling manner along said fin elements and into said combustion space to produce a substantially annular flame in said combustion space,
 (f) said manifold member being provided with a substantially central opening extending axially therethrough, and at least one orifice extending from said chamber rearwardly to the radially extending surface of said manifold member, said orifice emitting fuel from said chamber for mixture with air delivered from said air supply, said last mixture being then directed through said central opening and into said combustion space to produce a substantially second flame in said combustion space.

8. A burner assembly comprising
 (a) a tubular member adapted to be carried in a position having one end disposed in the combustion space of a furnace,
 (b) a manifold member carried by said tubular member and having an outer axially extending surface spaced from the inner wall of said tubular member,
 (c) a plurality of fin elements carried on said outer surface adjacent the inner wall of said tubular member,
 (d) said manifold member being adapted for connection to a source of fuel under pressure and having orifices disposed intermediate said fin elements whereby fuel is delivered to said combustion space from the space intermediate the outer surface of said manifold member and the inner wall of said tubular member,
 (e) means delivering a supply of air under pressure to the space intermediate said outer surface and the inner wall of said tubular member, and
 (f) said manifold member being provided with a substantially central opening communicating with said air supply means and at least one orifice in said manifold member being disposed adjacent said opening and communicating with said fuel supplied to said manifold member whereby a fuel-air mixture is discharged into the combustion space substantially on the axis of said tubular member.

9. A burner assembly comprising
 (a) a tubular member adapted to be carried in a position having one end disposed in the combustion space of a furnace,
 (b) a manifold member carried by said tubular member and having an outer axially extending surface spaced from the inner wall of said tubular member,
 (c) a plurality of fin elements carried on said outer surface adjacent the inner wall of said tubular member,
 (d) said manifold member being adapted for connection to a source of fuel under pressure and having orifices disposed intermediate said fin elements whereby fuel is delivered to said combustion space from the space intermediate the outer surface of said manifold member and the inner wall of said tubular member,
 (e) means delivering a supply of air under pressure to the space intermediate said outer surface and the inner wall of said tubular member,
 (f) said manifold member being provided with a substantially central opening communicating with said air supply means and at least one orifice in said manifold member being disposed adajcent said opening and communicating with said fuel supplied to said manifold member whereby a fuel-air mixture is discharged into the combustion space substantially on the axis of said tubular member, and
 (g) said fins being positioned to produce a swirling of the fuel-air mixture discharged into the combustion space from said fins.

10. A burner assembly for use with a furnace having a pressurized combustion space comprising
 (a) a tubular member adapted to be carried by the furnace in a position having one end disposed in the combustion space, (b) means delivering air under pressure to said tubular member,
(c) a manifold member carried in said tubular member downstream from said air delivery means and substantially blocking air flow through said tubular member whereby the pressure of the air is increased,
(d) a source of fuel under pressure and means conducting fuel from said source to said manifold member,
(e) said manifold member being provided with a plurality of radially disposed annularly spaced fuel emitting orifices,
(f) fin elements carried intermediate said orifices and directing a fuel-air mixture into said combustion space, and
(g) said manifold member being provided with a substantially central opening and at least one orifice in said manifold member being disposed adjacent said central opening and communicating with said fuel conducting means.

11. The burner assembly as defined in claim 10 and in which said fin elements are positioned to impart a swirl to the fuel-air mixture discharged into said combustion space whereby to induce a complete mixture of the air and fuel and to produce a substantially annular flame in said combustion space.

12. A burner assembly comprising
(a) a tubular member having one end adapted to be carried in the combustion space of a furnace and the other end connected to an air supply means,
(b) a hollow manifold member carried in said tubular housing and having an axially extending surface spaced from the inner wall thereof,
(c) a plurality of spaced fin elements carried on said surface,
(d) a source of fuel under pressure and means conducting fuels from said source to the interior of said manifold member,
(e) said manifold member being provided with a plurality of orifices disposed intermediate said fin elements whereby air from said air supply is mixed with fuel emitted by said orifices and directed by said fin elements into said combustion space,
(f) said manifold member substantially blocking air flow through said tubular housing whereby to build up the pressure of the fuel-air mixture discharged into said combustion space,
(g) said fin elements being positioned to impart a swirl to the fuel-air mixture discharged into said combustion space whereby to induce a complete mixture of the air and fuel and to produce a substantially annular first flame in said combustion space, and
(h) said manifold member being provided with a substantially central opening extending therethrough and at least one orifice being disposed in said manifold member closely adjacent said opening and being positioned to emit fuel against air flowing through said central opening whereby a substantially axially extending second flame is produced in said combustion space.

13. A burner assembly comprising
(a) a tubular member having one end adapted to be carried in the combustion space of a furnace and the other end connected to an air supply means,
(b) a hollow manifold member carried in said tubular housing and having an axially extending surface spaced from the inner wall thereof,
(c) a source of fuel under pressure and means conducting fuel from said source to the interior of said manifold member,
(d) a plurality of spaced fin elements carried on said surface,
(e) said manifold member being provided with a plurality of orifices disposed intermediate said fin elements whereby air from said air supply is mixed with fuel emitted by said orifices and directed by said fin elements into said combustion space,
(f) said fin elements engaging the inner wall of said housing,
(g) a radially extending flange portion being provided on said manifold member upstream of said fin elements, and
(h) the radially outward edge of said flange portion being spaced from the inner wall of said housing whereby to provide an annular passage intermediate said housing and said edge to direct air between said fin elements to mix with fuel emitted by said orifices.

References Cited by the Examiner

UNITED STATES PATENTS

| 1,078,584 | 11/1913 | Jones. | |
| 1,510,039 | 9/1924 | Canfield | 158—109 X |
| 1,965,847 | 7/1934 | Maxwell | 158—118 X |
| 2,855,033 | 10/1958 | Furczyk | 158—109 |

FOREIGN PATENTS

| 1,062,873 | 8/1959 | Germany. |
| 819,977 | 9/1959 | Great Britain. |

FREDERICK L. MATTESON, Jr., *Primary Examiner.*

JAMES W. WESTHAVER, *Examiner.*